United States Patent [19]

Kumura

[11] Patent Number: 4,803,899
[45] Date of Patent: Feb. 14, 1989

[54] START UP CONTROL FOR TRANSMISSION
[75] Inventor: Haruyoshi Kumura, Yokohama, Japan
[73] Assignee: Nissan Motor Co., Ltd., Yokohama, Japan
[21] Appl. No.: 161,353
[22] Filed: Feb. 22, 1988

Related U.S. Application Data

[63] Continuation of Ser. No. 882,352, Jul. 7, 1986.

[30] Foreign Application Priority Data

Jul. 8, 1985 [JP] Japan ................................ 60-148402

[51] Int. Cl.$^4$ ...................... B60K 41/12; B60K 41/18
[52] U.S. Cl. .................................... 74/866; 364/424.1
[58] Field of Search ....................... 74/866; 364/424.1

[56] References Cited

U.S. PATENT DOCUMENTS

| | | | |
|---|---|---|---|
| 3,684,066 | 8/1972 | Kubo et al. ...................... | 74/866 X |
| 3,813,964 | 6/1974 | Ichimura et al. .................... | 74/866 |
| 3,881,368 | 5/1975 | Furuhashi et al. .................... | 74/866 |
| 4,262,335 | 4/1981 | Ahlen et al. ........................ | 74/866 X |
| 4,590,561 | 5/1986 | Abo et al. .......................... | 74/866 X |
| 4,610,183 | 9/1986 | Nobumoto et al. ................... | 74/866 |

FOREIGN PATENT DOCUMENTS

| | | |
|---|---|---|
| 0069922 | 1/1983 | European Pat. Off. . |
| 0092227 | 10/1983 | European Pat. Off. . |
| 2336772 | 1/1974 | Fed. Rep. of Germany ........ 74/866 |
| 0184754 | 11/1982 | Japan .............................. 364/424.1 |
| 2017233 | 10/1979 | United Kingdom . |
| 1600595 | 10/1981 | United Kingdom . |
| 2097074 | 10/1982 | United Kingdom . |
| 2134608 | 8/1984 | United Kingdom . |
| 2155568 | 9/1985 | United Kingdom . |

OTHER PUBLICATIONS

Nissan Service Manual, No. 484, Jun. 1973.

Primary Examiner—Dirk Wright
Attorney, Agent, or Firm—Foley & Lardner, Schwartz, Jeffery, Schwaab, Mack, Blumenthal & Evans

[57] ABSTRACT

A transmission is shiftable in a power shift pattern by a control which provides the best acceleration performance when engine load is greater than a predetermined level and with a brake pedal depressed to activate a brake.

3 Claims, 7 Drawing Sheets

START UP CONTROL FOR TRANSMISSION

This application is a continuation, of application Ser. No. 882,352, filed July 7, 1986.

BACKGROUND OF THE INVENTION

The present invention relates to a control device for a transmission which is shiftable in a selected one of a plurality of shift patterns.

A control device is known wherein a shift pattern is switched automatically one after another, which control device is shown, for example, in Nissan Service Manual No. 484 (P47, P64) issued on June 1983 by Nissan Motor Company Limited (see pages 225 and 226). More specifically, a standard shift pattern and a power shift pattern are provided and one of them is automatically selected which is fit for the current running conditions. The standard shift pattern is fit for ordinary economical running, while the power shift pattern is fit for hill-climbing and rapid acceleration. Normally the standard pattern is selected, and it is switched to the power pattern when an accelerator pedal is depressed at a rate greater than a predetermined value. Such a predetermined value is set appropriately in accordance with a vehicle speed and a throttle opening degree at which the depression of the accelerator pedal commences. With the power pattern selected, if the opening degree of the throttle valve is returned to ⅛ of the fully opening degree, the standard pattern is selected again.

However, this known control device for transmission poses a problem that the power shift pattern is not selected though it is desired at so-called stall start-up (i.e., a start-up of the vehicle after a brake is released under conditions where the throttle valve is fully opened or almost opened with the brake activated). This is because the speed at which the accelerator pedal is depressed will not exceed the predetermined value after the throttle opening degree has already reached its fully opened position and thus even if the driver wishes rapid acceleration, the power shift pattern is not selected.

An object of the present invention is to provide a control device which is free from the above mentioned problem.

SUMMARY OF THE INVENTION

The present invention provides a control device for a transmission for a motor vehicle having an engine and a brake operable by a brake pedal, the transmission being shiftable in selected one of a plurality of shift patterns, the plurality of shift patterns including a predetermined shift pattern which provides the best acceleration performance, the control device comprising:

brake sensor means for detecting activation of the brake and generating a brake activation indicative signal indicative of the activation of the brake;

means for detecting engine load on the engine and generating an engine load indicative signal indicative of the engine load detected; and means for selecting the predetermined shift pattern when said engine load indicative signal is greater than a predetermined value in the presence of said brake activation signal and causing the transmission to shift in the predetermined shift pattern.

According to another aspect of the present invention, there is provided a method of controlling a transmission for a motor vehicle having an engine and a brake operable by a brake pedal, the transmission being shiftable in selected one of a plurality of shift patterns, the plurality of shift patterns including a predetermined shift pattern which provides the best acceleration performance, the method comprising the steps of:

detecting activation of the brake and generating a brake activation indicative signal indicative of the activation of the brake;

detecting engine load on the engine and generating an engine load indicative signal indicative of the engine load detected; and selecting the predetermined shift pattern when said engine load indicative signal is greater than a predetermined value in the presence of said brake activation signal and causing the transmission to shift in the predetermined shift pattern.

DETAILED DESCRIPTION OF THE INVENTION

Figure 1:
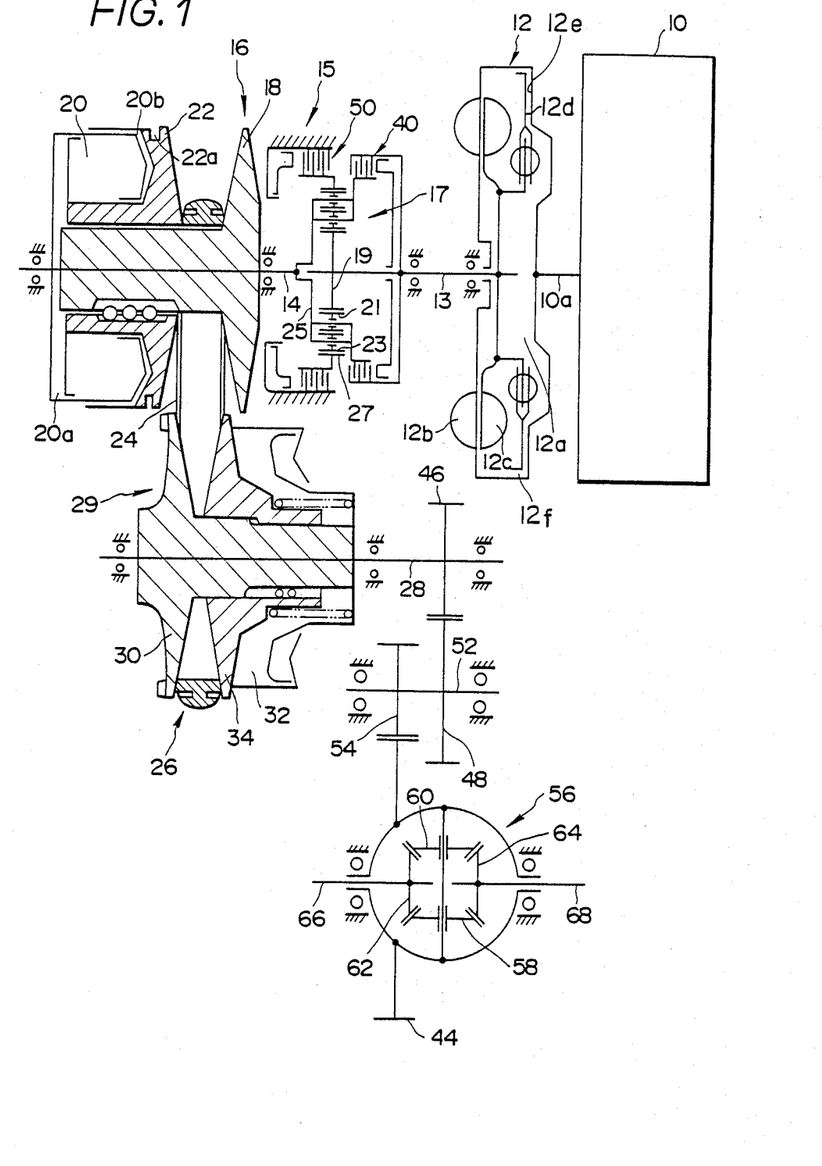
FIG. 1 is a schematic diagram showing a power transmission mechanism of a continuously variable transmission to which the present invention is applied.
Figure 2A:
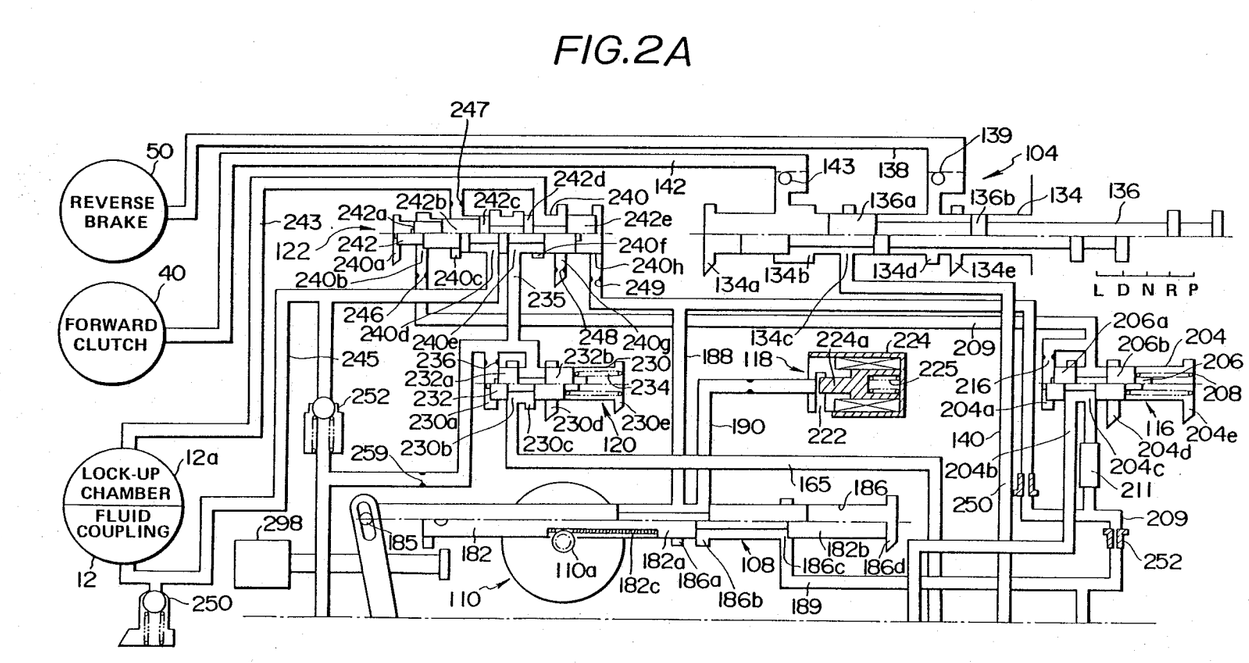
FIGS. 2A and 2B, when combined, illustrate a circuit diagram of a hydraulic control system for the transmission.
Figure 2B:
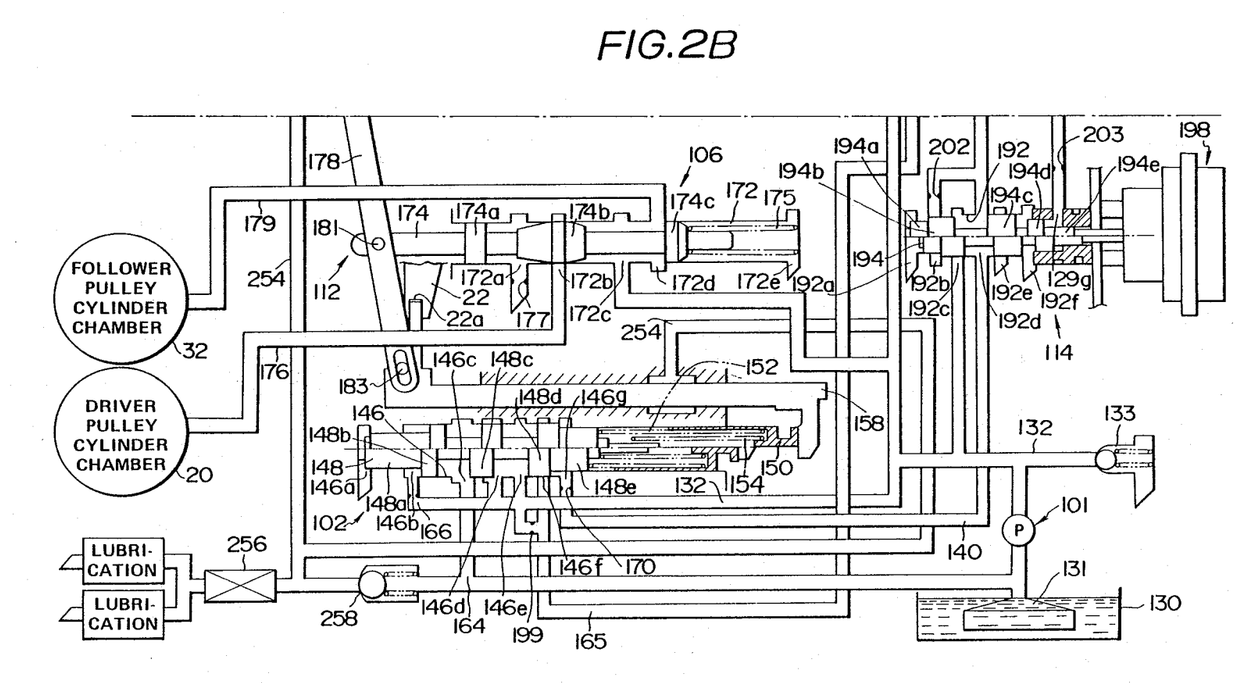
Figure 3:
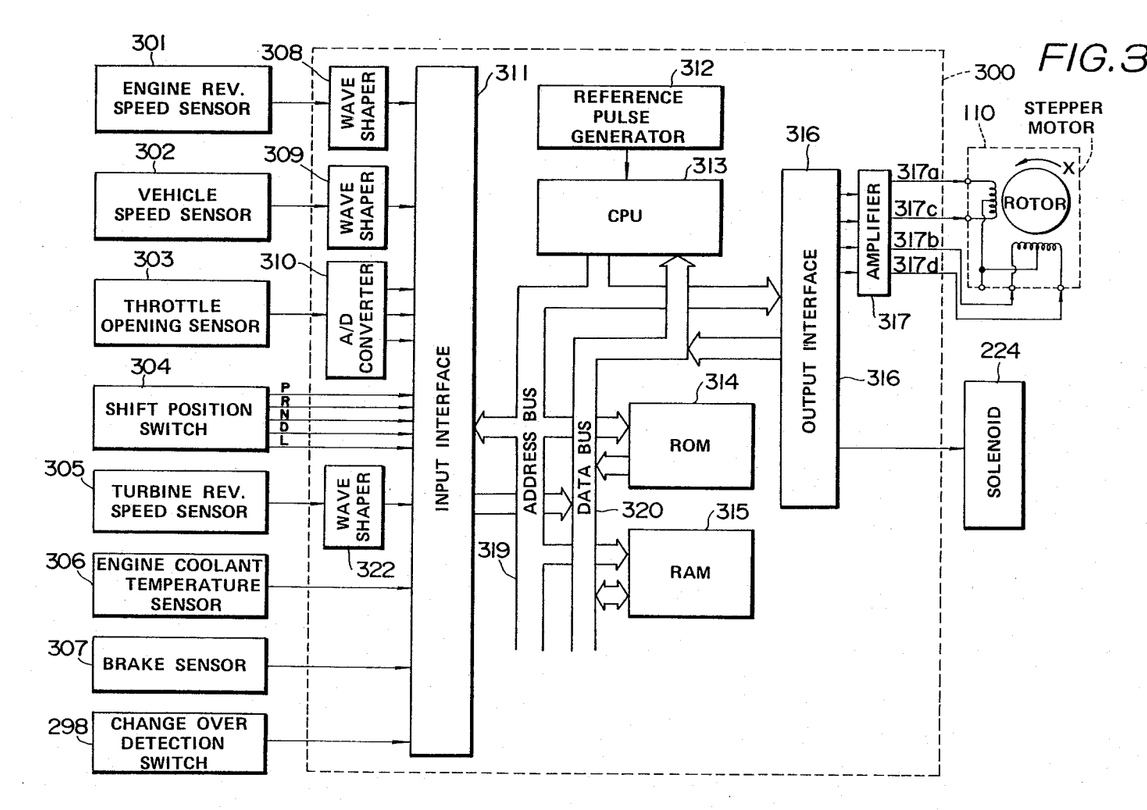
FIG. 3 is a block diagram showing a control unit.

Referring to FIGS. 1 to 3, there are shown the power transmission mechanism, hydraulic control system, and control unit of the continuously variable transmission. For understanding of these Figures, reference is made to U.S. patent application Ser. No. 792,422, which has been commonly assigned herewith and which has been incorporated by reference in its entirety (see particularly, FIG. 2, FIGS. 1A and 1B, and FIG. 3). U.S. patent application Ser. No. 792,422 was filed by Sigeaki et al. on Oct. 29, 1985 and assigned to the same assignee which the present application is assigned to, and has a corresponding European Patent application published under No. 0180209 on May 7, 1986.

Hereinafter, a concrete explanation as to control of stepper motor 110 and solenoid 224 is made.

Figure 4:
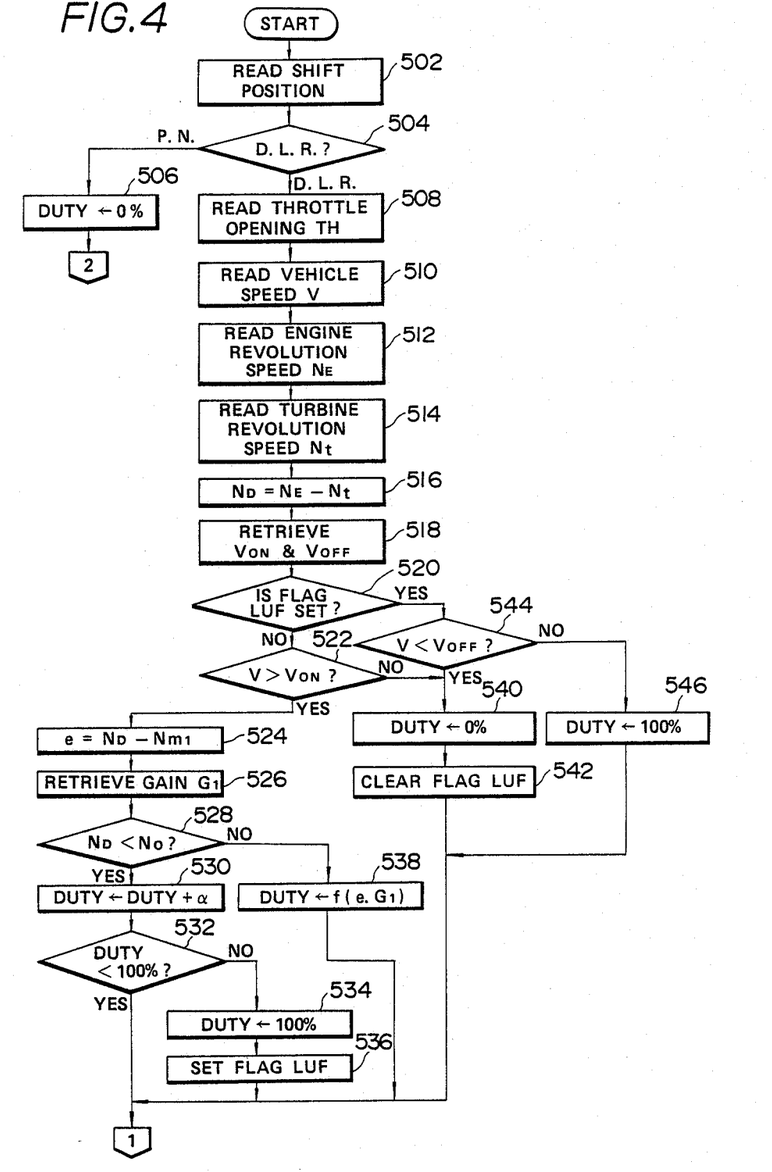
FIGS. 4, 5, and 6, when combined, show a flowchart of a control routine to be executed by the control unit.
Figure 5:
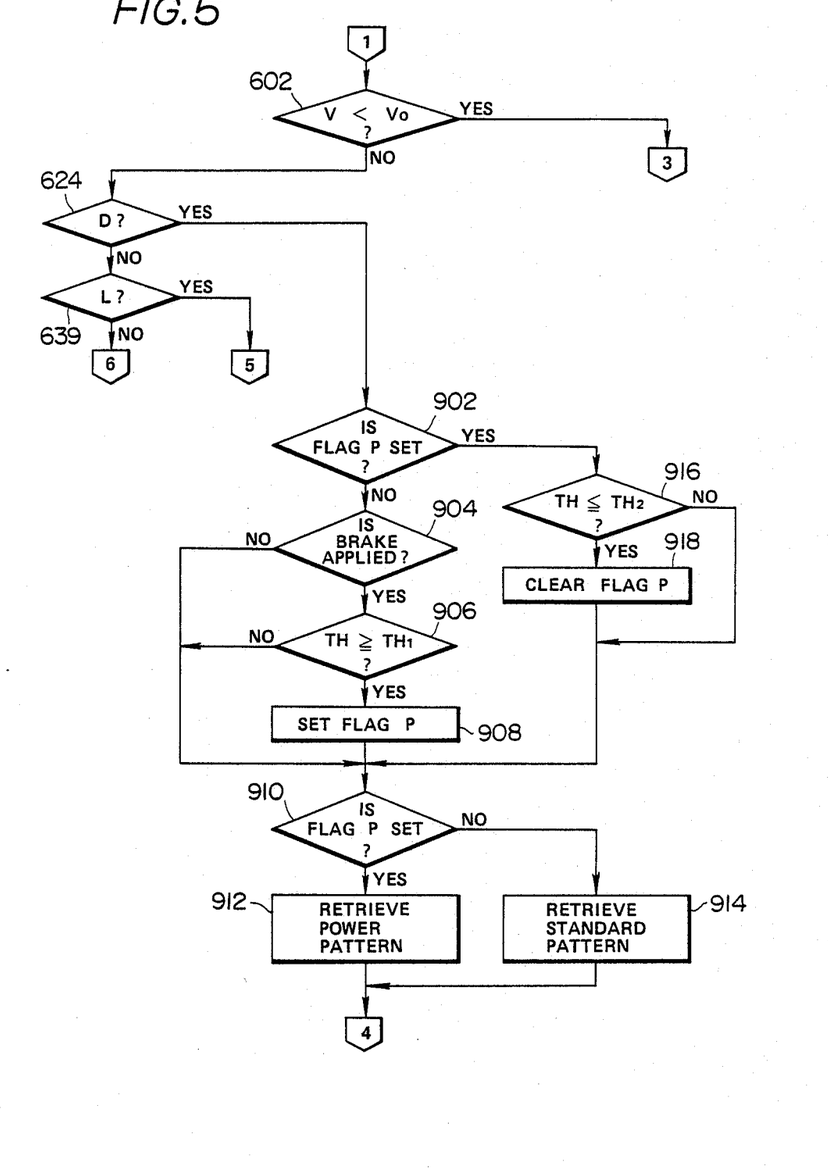
Figure 6:
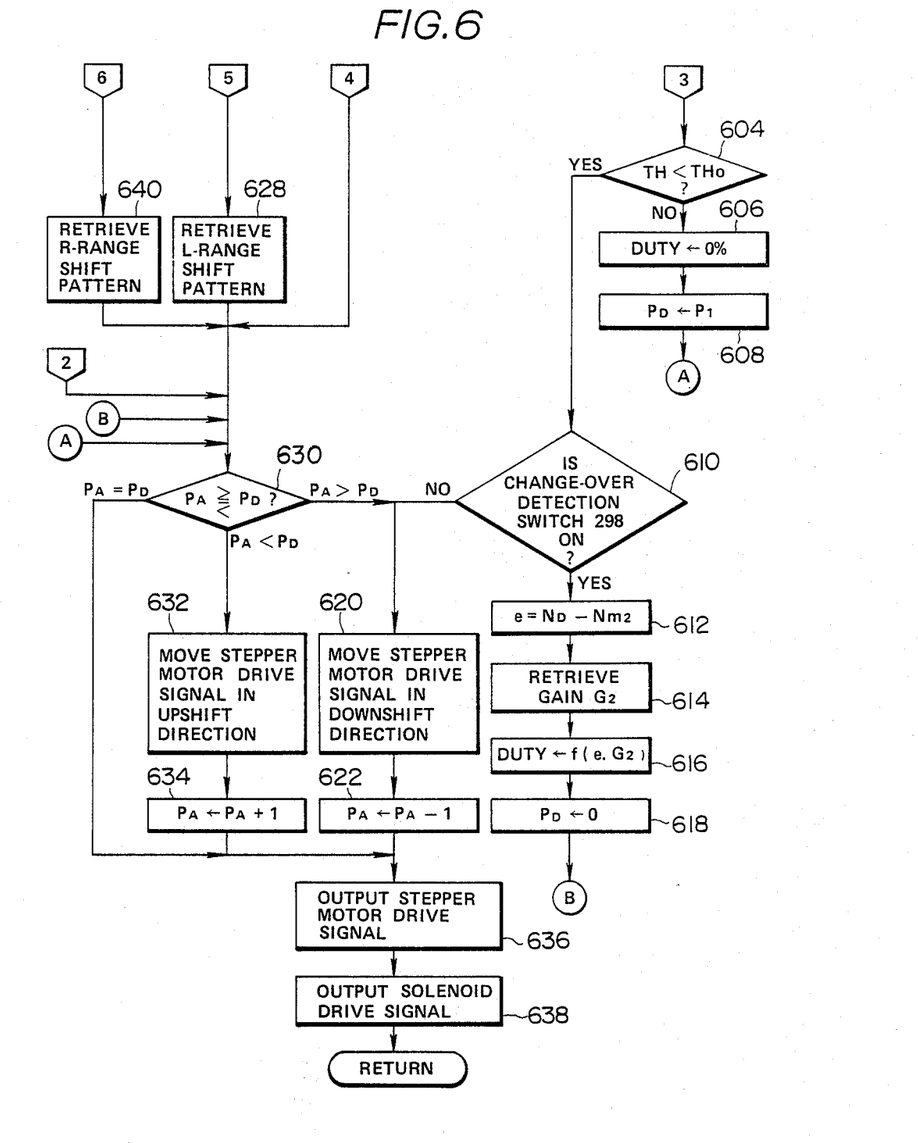

FIGS. 4 to 6 show the control routine for stepper motor 110 and solenoid 224. Shift position is read from shift position switch 304 (at step 502). Decision is made which one of drive or running positions (i.e., D, L or R range) is assumed (at step 504). When neither one of the drive positions is assumed, 0% is set as a duty ratio for solenoid 224 and placed at DUTY (at step 506). Then, step 630 is executed. When any one of the drive positions is assumed, throttle opening TH is read from throttle opening sensor 303 (at step 508); vehicle speed V is read from vehicle speed sensor 302 (at step 510); engine revolution speed $N_E$ is read from engine revolution speed sensor 301 (at step 512); and turbine revolution speed $N_t$ is read from turbine revolution speed sensor 305 (at step 514). Then, a difference $N_D$ of engine revolution speed $N_E$ from turbine revolution speed $N_t$ is calculated 9at step 516), and lock-up ON vehicle speed $V_{ON}$ and lock-up OFF vehicle speed $V_{OFF}$ are obtained by retrieval using vehicle speed V and throttle opening TH (at step 518). Data of lock-up ON vehicle speed $V_{ON}$ and lock-up OFF vehicle speed $V_{OFF}$ are stored versus vehicle speed V and throttle opening TH. Then, decision is made whether lock-up flag LUF is set (at step 520). When lock-up flag LUF is not set, decision is made whether actual vehicle speed V is larger than lock-up ON vehicle speed $V_{ON}$ (at step 522). In the case V is larger than $V_O$, a deviation e of $N_{ml}$ from $N_D$ is calculated (at step 524), where $N_{ml}$ is a target value of deviation $N_D$ of turbine revolution speed $N_t$ from engine revolution speed $N_E$. Retrieval is executed based on e to provide a feedback control gain $G_1$ (at step 526). Then, decision is made whether $N_D$ is smaller than a predetermined small value $N_O$ (at step 528), where $N_O$ is such a value that if $N_D$ is not smaller than $N_O$, feedback control is executed, while if $N_D$ is smaller than $N_O$, feedforward control is executed. When $N_D$ is smaller than $N_O$, present duty ratio DUTY is increased by $\alpha$(alpha) % and the result is placed as a new duty ratio at DUTY (at step 530). Then, a decision is made whether duty ratio is lower than 100% (at step 532). When duty ratio DUTY is lower than 100%, step 602 is executed, while when duty ratio DUTY is not lower than 100%, duty ratio 100% is set and placed at DUTY (at step 534), and then lock-up flag LUF is set (at step 536) before executing the later mentioned step 602. (That is, feedforward control is executed.) In the case the difference $N_D$ is not smaller than $N_0$ at the before mentioned step 528, the duty ratio DUTY is determined based on the difference e and the feedback gain $G_1$ (at step 538), and then step 602 is executed. In the case vehicle speed V is not higher than $N_{ON}$ at step 522, duty ratio 0% is set and placed at DUTY (at step 540), and then lock-up flag LUF is cleared (at step 542). In this process, the actuation of the lock-up mechanism is released. If, at step 520, lock-up flag LUF is set, a decision is made whether vehicle speed V is lower than lock-up OFF vehicle speed $V_{OFF}$ (at step 544). When vehicle speed V is lower than $V_{OFF}$, step 540 and then step 542 are executed (lock-up release), whereas when vehicle speed V is not lower than $V_{OFF}$, duty ratio 100% is set and placed at DUTY (at step 546).

Through the execution of the steps 502 to 546 explained above, the following control is brought about. That is, whenever the shift position is in the P or N range position, i.e., not any of the drive range positions, the lock-up state is always released (see step 506), whereas, under a condition when the shift position is one of the drive range positions, when vehicle speed V is higher than lock-up OFF vehicle speed $V_{OFF}$, the lock-up state is maintained (see step 546), and on the other hand, when vehicle speed V is lower than lock-up OFF vehicle speed $V_{OFF}$, the actuation of lock-up state is released (see step 540). Besides, upon shifting from a non-lock-up state (release state) to a lock-up state, the lock-up mechanism, i.e., friction clutch element 12d, is smoothly engaged owing to feedback control (see step 538) or feedforward control (see step 530) depending on the amount of slip within fluid coupling 12.

Referring also to FIG. 5, after executing step 532 or 536 or 538 or 542 or 546, step 602 is executed. At step 602, a decision is made whether vehicle speed V is lower than a predetermined small value $V_0$ ($V_0$ is 2 to 3 Km/h, for example, that is lower than $V_{ON}$ and $V_{OFF}$). IF vehicle speed V is lower than $V_0$, the creep control is executed, whereas if vehicle speed V is not lower than $V_0$, the shift control is executed. In the case vehicle speed V is lower than $V_0$, a decision is made whether throttle opening degree TH is less than a predetermined small value $TH_0$ (at step 604 shown in FIG. 6). Referring to FIG. 6, when throttle opening degree TH is not less than $TH_0$, i.e., when the throttle is not at the idle position, duty ratio 0% is set and placed at DUTY (at step 606) (whereupon forward clutch 40 is completely engaged), and a pulse number $P_1$ is set as a target pulse number $P_D$ of stepper motor 110 (at step 608). Pulse number $P_1$ is indicative of the operating position of stepper motor 110 which corresponds to the maximum reduction ratio. (That is, the operating position of stepper motor 110 determined by this pulse number $P_1$ is a boundary between shift control range and overstroke range.) After step 608, the program proceeds to step 630, initiating such a control as to bring actual position of stepper motor 110 into agreement with the position designated by the pulse number $P_1$. When, at step 604, the throttle opening degree TH is less than $TH_0$, i.e., the throttle takes an idle position, a decision is made whether change-over detection switch 298 is ON (at step 610). When, at step 610, change-over detection switch 298 is OFF, stepper motor drive signal is shifted in a downshift direction (at step 620), and pulse number $P_A$ is decreased by a value 1 (at step 622) before the output of stepper motor drive signal (at step 638) and the output of solenoid drive signal (at step 638). After the execution of step 620, stepper motor 110 is rotated by one step toward the overstroke range (i.e., in downshift direction). The execution of processing flow from step 610 to step 620 following by the subsequent steps is repeated until rod 182 of stepper motor 110 moves into the overstroke range when change-over detection switch 298 is turned ON. After change-over detection switch 298 is turned O, a difference between $N_D$ and $N_{m2}$ is set as e (at step 612), $N_D$ designating a difference between engine revolution speed NE and turbine revolution speed $N_t$, $N_{m2}$ designating a target deviation. Based on the value e, retrieval is made to give a feedback gain $G_2$ (at step 614). Then, a duty ratio is obtained as a function of the deviation e and feedback gain $G_2$ and placed at DUTY (at step 616), and 0 (zero) is placed as target pulse number at $P_D$ (at step 618) before execution of step 630.

Referring again to FIG. 5, if, at step 602 before mentioned, vehicle speed V is not lower than $V_0$, a decision is made whether shift position is D range position (at step 624). When shift position is D range, CPU 313 proceeds to step 902 shown in FIG. 5 which will be described later. When shift position is not in D range and it is decided that shift position is in L range (at step 639), L-range shift pattern is retrieved (at step 628 shown in FIG. 6). When, at step 639, it is decided that shift position is not L range, R-range shift pattern is retrieved (at step 640 shown in FIG. 6). As a result of the process at each of the retrieval steps, target pulse number $P_D$ is determined. Then, actual pulse number $P_A$ is compared with target pulse number $P_D$ obtained by retrieval (at step 630). When $P_D$ is equal to $P_A$, steps 636 and 638 are executed where stepper motor drive signal and solenoid drive signal are outputted without any alteration. When $P_A$ is smaller than $P_D$, stepper motor drive signal is shifted in an upshift direction (at step 632), and actual pulse number $P_A$ is increased by a value 1 (at step 634) before the output of stepper motor drive signal and solenoid drive signal at steps 636 and 638. When $P_A$ is larger than $P_D$, stepper motor drive signal is shifted in downshift direction (at step 620), and actual pulse number $P_A$ is decreased by a value 1 (at step 622) before the output of stepper motor drive signal at step 636 and the output of solenoid drive signal at step 638. For better understanding of stepper motor control using the actual pulse number and stepper motor drive signal, reference should be made to copending U.S. application Ser. No. 486,448, filed Apr. 19, 1983 now U.S. Pat. No. 4,597,308 (EP counterpart: EP publication No. 0092228, published on Oct. 26, 1983). This copending U.S. application also discloses a lock-up control using an electromagnetic valve emploging a solenoid.

It will now be understood from the foregoing description along the flowchart, the flowchart illustrated herein is substantially the same as the flowchart of FIGS. 4 and 5 of the U.S. patent application Ser. No. 792,422 having been incorporated by reference. However, the former is different from the latter in that processing beginning with step 902 and ending with step 912 or step 914 has been added to replace step 626 shown in FIG. 5 of the U.S. Patent Application having been incorporated.

Referring to FIG. 5, if execution of step 624 results in YES, i.e., the shift position is in D range, CPU 313 proceeds to step 902 where it decides whether flag P is set. If flag P is not set, the CPU 313 proceeds to step 904 where it decides whether brake sensor 307 is rendered on. If brake sensor 307 is in the on position, indicating that the brake is activated or applied, the CPU 313 proceeds to step 906 where it decides whether throttle opening degree TH indicative of engine load is greater than a predetermined large value $TH_1$ (for example, 6/8 throttle opening degree). If TH is not less than $TH_1$, the CPU 313 proceeds to step 908 where it sets flap P. If flap P is set as a result of execution of step 910, the CPU 313 proceeds to step 912 where it retrieves power pattern. If flag P is not set, the CPU 313 proceeds to step 914 where it retrieves standard pattern. If the brake is not activated as a result of execution of step 904 or throttle opening degree TH is less than $TH_1$ as a result of execution of step 906, the CPU 313 proceeds directly to step 910. After retrieval of the power pattern or standard pattern, the CPU 313 proceeds to step 630 shown in FIG. 6. As a result of the above mentioned operation, the power pattern is selected under conditions where the brake is activated and the throttle opening degree is large, and the standard pattern is otherwise selected.

Tha state where the power pattern is selected after the flag P has been set is released in the following manner. That is, if flag P is set at execution of step 902, the CPU 313 proceeds to step 916 where it decides whether throttle opening degree TH is not greater than a predetermiend small value $TH_2$ (for example, ⅛ throttle opening degree). If TH is greater then $TH_2$, the CPU 313 proceeds to step 910. If TH is not greater than $TH_2$, the CPU 313 proceeds to step 918 where it clears flag P. If, with flag P being cleared, the CPU 313 proceeds to 910, the standard pattern is retrieved at execution 4of step 914. Thus, the state where the power pattern is selected is released if the throttle opening degree becomes small.

Therefore, the previously described control allows selection of the power pattern when the throttle opening is large with the brake being activated. Since so-called stall start-up satisfies the above conditions, the power pattern is selected. This provides a strong acceleration The state where the power pattern is selected is released is the throttle opening degree becomes small.

Although, in this embodiment, the power pattern is not selected in response to rapid increase in throttle opening degree, in the case this kind of control is to be executed, there is provided strong acceleration at stall start-up if steps 902 to 918 are provided.

What is claimed is:

1. A control device for a transmission for a motor vehicle having an engine and a brake adapted to be activated by a brake pedal, the transmission being shiftable in selected one of a plurality of shift patterns, the plurality of shift patterns including a predetermined shift pattern which provides the best acceleration performance, the control device comprising:

brake sensor means for detecting activation of the brake and generating a brake activation indicative signal when the brake is activated;

means for detecting engine load on the engine and generating an engine load indicative signal indicative of the engine load detected;

means for comparing said engine load indicative signal with a predetermined value;

means responsive to said brake activation indicative signal and the result of said comparison by said comparing means for determining a stall start up condition by sensing when the load indicative signal is greater than the predetermined value at the same time that the brake is activated and selecting the predetermined shift pattern during said stall start up condition.

2. A method of controlling a transmission for a motor vehicle having an engine and a brake adapted to be activated by a brake pedal, the transmission being shiftable in selected one of a plurality of shift patterns, the plurality of shift patterns including a predetermined shift pattern which provides the best acceleration performance, the method comprising the steps of:

detecting activation of the brake and generating a brake activation indicative signal when the brake is activated;

detecting engine load on the engine and generating an engine load indicative signal indicative of the engine load detected;

comparing said engine load indicative signal with a predetermined value;

determining a stall start up condition by sensing when the load indicative signal is greater than said predetermined value at the same time that the brake is activated; and causing the transmission to shift in the predetermined shift pattern in response to the stall start up condition being determined.

3. A control device as claimed in claim 1, wherein said engine load detecting means is a throttle opening sensor which detects a throttle opening degree of the engine throttle.

* * * * *